(12) United States Patent
Pastrana-Rios et al.

(10) Patent No.: US 11,000,852 B2
(45) Date of Patent: May 11, 2021

(54) SAMPLING ARRAY DEVICES AND SYSTEM FOR SPECTRAL ANALYSIS

(71) Applicant: PROTEIN DYNAMIC SOLUTIONS, INC., Wakefield, MA (US)

(72) Inventors: Belinda Pastrana-Rios, Wakefield, MA (US); Jose Javier Rodriguez-Toro, Mayaguez, PR (US)

(73) Assignee: Protein Dynamic Solutions, Inc., Wakefield, MA (US)

( * ) Notice: Subject to any disclaimer, the term of this patent is extended or adjusted under 35 U.S.C. 154(b) by 0 days.

(21) Appl. No.: 16/094,763

(22) PCT Filed: Apr. 20, 2017

(86) PCT No.: PCT/US2017/028674
§ 371 (c)(1),
(2) Date: Oct. 18, 2018

(87) PCT Pub. No.: WO2017/184886
PCT Pub. Date: Oct. 26, 2017

(65) Prior Publication Data
US 2020/0030793 A1    Jan. 30, 2020

Related U.S. Application Data

(60) Provisional application No. 62/326,604, filed on Apr. 22, 2016.

(51) Int. Cl.
*B01L 3/00* (2006.01)
*B01L 9/00* (2006.01)
*G02B 21/34* (2006.01)

(52) U.S. Cl.
CPC ......... *B01L 3/50853* (2013.01); *B01L 3/5088* (2013.01); *B01L 9/523* (2013.01);
(Continued)

(58) Field of Classification Search
CPC .... B01L 3/50853; B01L 3/5088; B01L 9/523; B01L 2300/0822; B01L 2300/12;
(Continued)

(56) References Cited

U.S. PATENT DOCUMENTS 4,722,598 A * 2/1988 Ford ..................... G02B 21/34
356/246
2004/0126766 A1    7/2004 Amorese
(Continued)

FOREIGN PATENT DOCUMENTS

JP    2006177875 A    7/2006
JP    2008029244    *    2/2008
(Continued)

OTHER PUBLICATIONS

International Search Report and Written Opinion dated Nov. 21, 2017 in International (PCT) Application No. PCT/US2017/028674 (18 pages).
International Preliminary Report on Patentability dated Oct. 23, 2018 in International (PCT) Application No. PCT/US2017/028674 (11 pages).

*Primary Examiner* — Robert R Raevis
(74) *Attorney, Agent, or Firm* — Hogan Lovells US LLP

(57) ABSTRACT

A system for use in spectral analysis procedures can include a slide and a holder for carrying the slide. The slide includes a substrate forming a plurality of wells that are recessed relative to a surface of the substrate. Each of the wells forms a sample region that is recessed by a sample depth from the surface and a trough region that is recessed by a trough depth from the surface, the trough depth being greater than the sample depth. The holder includes a body defining a cavity between a first side and a second side of the body, a port for receiving the slide into the cavity, one or more first fenestrations on the first side, and one or more second fenestrations on the second side.

5 Claims, 12 Drawing Sheets

(52) U.S. Cl.
CPC ... *B01L 2300/0822* (2013.01); *B01L 2300/12* (2013.01); *B01L 2300/1872* (2013.01); *G02B 21/34* (2013.01)

(58) Field of Classification Search
CPC ............. B01L 2300/1872; B01L 9/522; B01L 2300/1861; G02B 21/34
USPC ............ 73/864.91, 864.24, 864.25; 422/82.05–82.11, 551–554, 563; 356/39–41, 300–334, 436, 440–442, 244, 356/246; 250/306, 307, 440.11, 343–346, 250/339.01, 339.06–339.12, 340
See application file for complete search history.

(56) References Cited

U.S. PATENT DOCUMENTS

| | | | |
|---|---|---|---|
| 2011/0027914 A1* | 2/2011 | Bunce | G01N 35/1065 436/518 |
| 2013/0189770 A1* | 7/2013 | Wu | B01L 3/5085 435/288.4 |

FOREIGN PATENT DOCUMENTS

| | | |
|---|---|---|
| JP | 2008076136 A | 4/2008 |
| WO | 2004048929 A2 | 6/2004 |
| WO | 2006130790 A1 | 12/2006 |

\* cited by examiner ically lowering the production yields and increasing risk of withdrawal. This is at the core of analytical technologies to understand characterization, comparability/similarity, release and stability testing of protein therapeutics. The proposed technology also lends itself to high throughput multivariate analysis.

SAMPLING ARRAY DEVICES AND SYSTEM FOR SPECTRAL ANALYSIS

CROSS-REFERENCE TO RELATED APPLICATIONS

This application is a National Stage application under 35 U.S.C. § 371 of PCT International Application No. PCT/US2017/028674, entitled "SAMPLING ARRAY DEVICES AND SYSTEM FOR SPECTRAL ANALYSIS," filed Apr. 20, 2017, which claims the benefit of U.S. Provisional Application No. 62/326,604, entitled "SAMPLING ARRAY DEVICES AND SYSTEM FOR SPECTRAL ANALYSIS," filed Apr. 22, 2016, the entirety of both of which are incorporated herein by reference.

STATEMENT REGARDING FEDERALLY SPONSORED RESEARCH

This invention was made with Government support under Award Nos. 1632420 and 1447918 awarded by the National Science Foundation. The Government has certain rights in this invention.

BACKGROUND

Protein aggregation phenomena are prevalent throughout the industrial bioprocess. Proteins are expensive to express, isolate, and purify due to their complex physical-chemical characteristics. Aggregation is considered a primary mode of protein degradation, often leading to immunogenicity in patients, anti-drug antibody (ADA) response, and a loss of efficacy. The detection and determination of protein aggregates is a major objective in the biopharmaceutical industry and other areas of scientific research. The formation of protein aggregates is important in industrial applications because they can significantly affect the production of protein therapeutics (i.e., biologics or biosimilars), effectively lowering the production yields and increasing risk of withdrawal. This is at the core of analytical technologies to understand characterization, comparability/similarity, release and stability testing of protein therapeutics. The proposed technology also lends itself to high throughput multivariate analysis.

SUMMARY

The subject technology is illustrated, for example, according to various aspects described as numbered clauses (1, 2, 3, etc.) for convenience. Various examples of aspects of the subject technology are described below. These are provided as examples and do not limit the subject technology. It is noted that any of the dependent clauses may be combined in any combination, and placed into a respective independent clause. The other clauses can be presented in a similar manner.

Clause 1. A slide comprising:
a substrate forming a plurality of wells that are recessed relative to a surface of the substrate, wherein each of the wells forms a sample region that is recessed by a sample depth from the surface and a trough region that is recessed by a trough depth from the surface, the trough depth being greater than the sample depth.

Clause 2. The slide of clause 1, wherein the substrate transmits electromagnetic radiation.

Clause 3. The slide of clause 1, wherein the substrate is a salt.

Clause 4. The slide of clause 1, wherein the substrate comprises AgBr, AgCl, Al2O3, AMTIR, BaF2, CaF2, CdTe, CsI, diamond, Ge, KBr, KCl, KRS-5, LiF, MgF2, NaCl, Si, SiO2, ZnS, ZnSe, and/or ZrO2.

Clause 5. The slide of clause 1, wherein a periphery of the slide forms a bilaterally asymmetric shape.

Clause 6. The slide of clause 1, wherein the trough region extends entirely about the sample region.

Clause 7. The slide of clause 1, wherein the sample region is concentrically within the trough region.

Clause 8. The slide of clause 1, wherein the plurality of wells are provided in a plurality of rows, wherein each row comprises at least two of the plurality of wells.

Clause 9. A system comprising
a slide comprising:
a substrate forming a plurality of wells that are recessed relative to a surface of the substrate;
a holder, comprising:
a body defining a cavity between a first side and a second side of the body;
a port for receiving the slide into the cavity;
one or more first fenestrations on the first side; and
one or more second fenestrations on the second side.

Clause 10. The system of clause 9, further comprising a block configured to secure the slide within the cavity when the block is placed within the port.

Clause 11. The system of clause 9, further comprising a cover configured to enclose each of the wells when placed upon the surface of the slide.

Clause 12. The system of clause 11, wherein the cover is configured to transmit electromagnetic radiation.

Clause 13. The system of clause 11, wherein the cover and the slide have a substantially equal thickness in a direction orthogonal to the surface of the slide when the cover is placed upon the surface of the slide.

Clause 14. The system of clause 9, wherein the body of the holder absorbs substantially all electromagnetic radiation incident to the holder.

Clause 15. The system of clause 9, wherein the plurality of wells are provided in a plurality of rows, wherein each row comprises at least two of the plurality of wells.

Clause 16. The system of clause 15, wherein the one or more first fenestrations comprises a number of first windows equal to a number of the plurality of rows, and the one or more second fenestrations comprises a number of second windows equal to the number of the plurality of rows.

Clause 17. The system of clause 16, wherein one of the first windows and one of the second windows are on opposite sides of one of the plurality of rows when the slide is within the holder.

Clause 18. The system of clause 9, wherein the port is disposed on a third side of the holder.

Clause 19. The system of clause 9, wherein the first side is opposite the second side.

Clause 20. The system of clause 9, wherein at least one of the plurality of wells, the one or more first fenestrations, and the one or more second fenestrations are aligned along an axis when the slide is within the cavity.

Clause 21. The system of clause 9, wherein the slide, the one or more first fenestrations, and the one or more second fenestrations are configured to transmit electromagnetic radiation.

Clause 22. The system of clause 9, further comprising a coating on an inner surface of the body.

Clause 23. The system of clause 22, wherein the coating comprises silicone.

Clause 24. The system of clause 9, further comprising a cap in thermal contact with an outer surface of the holder, the cap comprising one or more third fenestrations.

Clause 25. The system of clause 9, further comprising a plate attached to an imaging device.

Clause 26. A method comprising:
providing samples to each of a plurality of wells formed in a slide, each of the wells being recessed relative to a surface of the slide;
enclosing the wells by applying a cover to the surface of the slide;
inserting the slide and the cover into a cavity of a holder; and
emitting electromagnetic radiation through one or more first fenestrations of the holder, one or more second fenestrations of the holder, and the sample.

Clause 27. The method of clause 26, further comprising inserting the holder into a receptacle of a plate attached to an imaging device.

Clause 28. The method of clause 27, wherein inserting the holder comprises positioning the sample at a focal length of the imaging device.

Clause 29. The method of clause 26, further comprising heating the samples to a target temperature by conducting heat through the holder.

Clause 30. The method of clause 26, further comprising placing a cap in thermal contact with an outer surface of the holder.

Clause 31. The method of clause 30, wherein the emitting the electromagnetic radiation comprises emitting the electromagnetic radiation through one or more third fenestrations of the cap.

Clause 32. The method of clause 26, wherein the inserting the slide and the cover comprises inserting the slide and the cover through a port of the holder.

Clause 33. The method of clause 32, further comprising, after inserting the slide in the cover, obstructing the port with a block.

Clause 34. The method of clause 26, wherein the electromagnetic radiation is infrared light.

Clause 35. The method of clause 26, further comprising, after the emitting the electromagnetic radiation, detecting a characteristic of the electromagnetic radiation not absorbed by the sample.

Clause 36. The method of clause 26, further comprising:
after the emitting the electromagnetic radiation, changing the temperature of the sample; and
emitting additional electromagnetic radiation through the one or more first fenestrations and the one or more second fenestrations of the holder and through the sample.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this description, illustrate aspects of the subject technology and, together with the specification, serve to explain principles of the subject technology.

DETAILED DESCRIPTION

Figure 1A:
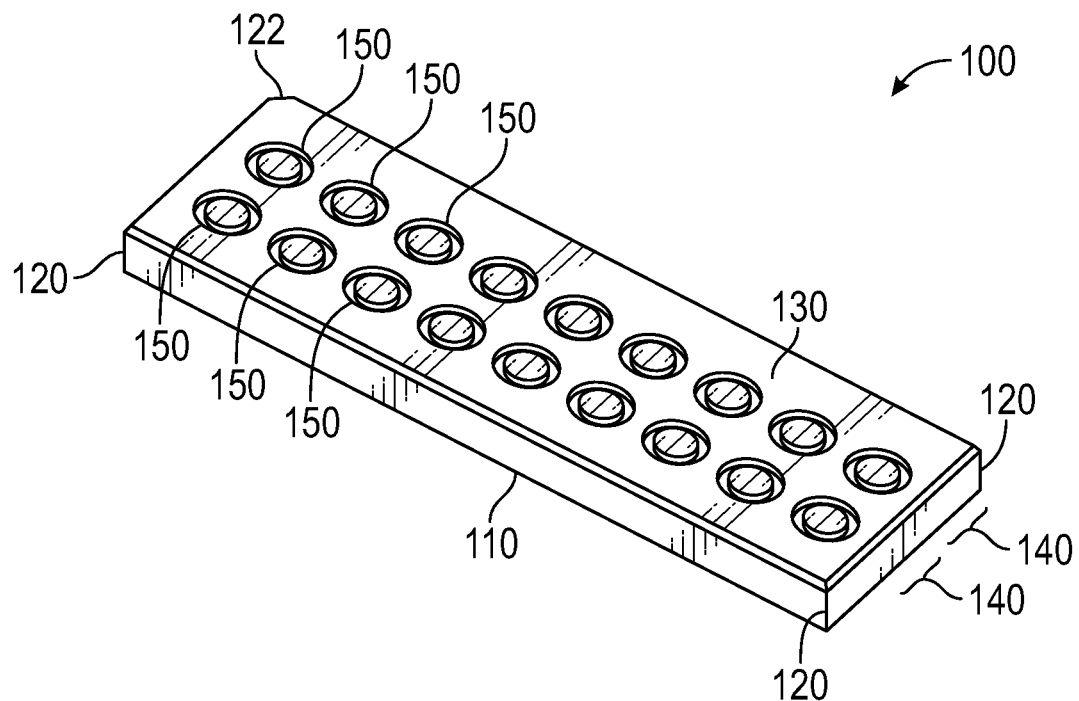
FIG. 1A shows a perspective view of a slide in accordance with some embodiments of the subject technology.

In the following detailed description, specific details are set forth to provide an understanding of the subject technology. It will be apparent, however, to one ordinarily skilled in the art that the subject technology may be practiced without some of these specific details. In other instances, well-known structures and techniques have not been shown in detail so as not to obscure the subject technology.

The biologics and biosimilar industry is involved in the research, development, and manufacturing of complex drugs known as protein therapeutics. The research and development efficiency can be undesirably low, which increases costs of drug development due to the high attrition rate of protein therapeutics. The costs of protein therapeutic development is significantly impacted by early and late stage failure. One way to lower research and development costs is to perform a series of evaluations of the protein therapeutic candidate early in the research and development phase. By performing the characterization of the therapeutic protein under varying formulation conditions and stressors early in the research and development phase, a predictive profile of the therapeutic candidate is generated to assess the risk of protein aggregation. This approach has been defined as a developability assessment. This assessment can provide important information for decision making, such as selecting protein therapeutic candidates for further development. When protein aggregation occurs the protein therapeutic typically has decreased efficacy and can elicit an immune response. In severe cases, such an immune response can be fatal.

The problem of protein aggregation is complex and frequently involves several different chemical processes, which are difficult to discern. Aggregation may be stress induced and involve physical or chemical changes such as agitation or stirring, oxidation, deamination and temperature changes. Even a slight change in pH, salt conditions, protein concentration or formulation conditions can also induce protein aggregation. Again, aggregation leads to lower yields in production, loss of efficacy of the protein therapeutic, and safety concerns in relation to immunogenicity risks. Currently, available techniques to assess aggregation do not address all of the factors that are involved in the process, such as the size, identity, mechanism and extent of aggregation, and stability of the protein therapeutic in solution. Several techniques have been developed to address the size of the aggregate or particulate, yet they do not determine the identity. Other techniques can determine the size and the identity of aggregates, but cannot determine the extent of aggregation or identify the aggregation prone regions. The amino acid side chains present in a protein are important contributors to the stability of proteins. Yet to date, with the available routine high throughput bench instrumentation the relationship between the weak chemical interactions involving side chains and the stability of the secondary structure of the protein candidate has not been ascertained.

The stability of the protein therapeutic is also critical for drug development, and cannot be fully characterized by simply identifying the thermal transition temperature of the protein. A greater level of understanding is needed to fully address the stability of protein therapeutics. For example it would be beneficial to understand 1) the relative stability of the domains within the protein of interest, 2) how the amino acid side chains contribute to the stability the domains, 3) whether the amino acid side chains are involved in the aggregation mechanism, and 4) if an excipient can stabilize weak interactions (e.g., in amino acid side chains) within the critical regions in specific domains of the protein therapeutic. There is a gap in understanding the factors that are important for determining the mechanism of protein aggregation.

To date when commercially available techniques are used orthogonally, differences in the sensitivity of the available techniques is a concern. In general, such techniques focus on determining the size, purity and stability of the protein therapeutic, and evaluate the presence or absence of protein aggregates or particulates in a formulation, to achieve lot-to-lot consistency.

There is a need for technology that can be used to better assess the developability of protein therapeutics, and for the comparability assessments needed to maintain and ensure product integrity, efficacy and safety. Such a process would need to be recognized as sufficient to ensure product integrity, efficacy and safety by the Food and Drug Administration (FDA) Center for Drug Evaluation (CDER) division and other relevant regulatory bodies.

Aspects of the subject technology provide a fast, accurate, and reproducible technique to determine the size, identity, mechanism, and extent of aggregation and the stability of a protein therapeutic, or other chemicals, in a single experiment. Aspects of the subject technology address comparability assessment of different protein therapeutic candidates and developability assessment of protein therapeutic candidates.

Aspects of the subject technology provide a system that includes reusable components, requires small sample sizes, reduces or eliminates sample evaporation, provides excellent signal/noise ratio with no observed fringes, a fixed path length relative to an imaging device allowing for quantitative analysis, excellent comparability assessment assays, developability assessment using Design of Experiment (DOE) approach, and assessment of aggregation reversibility during a thermal dependence study.

Aspects of the subject technology provide a sample carrying device with enhanced thermal conductivity, ease of loading and unloading, enhanced securement of samples, uniform temperature distribution, optimal focusing with an imaging device, and high throughput data acquisition.

According to some embodiments, for example as shown in FIGS. 1A-IE, a slide 100 can include a substrate 110 that forms a plurality of wells 150. Each of the wells 150 can be recessed relative to a surface 130 of the substrate 110. The surface 130 can be substantially flat or planar except where a well 150 is present. As used herein, a substantially flat or planar surface is one that varies from exactly flat or planar within a tolerance that is typical for an applicable manufacturing process. Each of the wells 150 can form a sample region 160 for receiving a sample to be analyzed and a trough region 170 for receiving excess portions of the sample.

The wells 150 can be provided in separate rows 140. For example, a first row 140 can include a first number of wells 150, and a second row 140 can include a second number of wells 150. The rows 140 can include the same number of wells 150 or different numbers of wells 150. The slide 100 can include any number of rows 140 and any number of wells 150 within each row 140. For example, the slide 100 can include one, two, three, four, five, six, seven, eight, nine, or more than nine rows 140. Each row 140 can include one, two, three, four, five, six, seven, eight, nine, or more than nine wells 150. The number of rows 140 and wells 150 can be selected based on a desired number of separate samples to be simultaneously analyzed on a single slide 100.

According to some embodiments, the slide 100 can be used to analyze a large number of samples along with a reference in the same slide 100. One of the wells 150 can be provided with the reference for analysis under the same conditions (e.g., temperature, humidity, etc.) as those of the samples on the slide 100. According to some embodiments, features of the slide 100 can provide an indication regarding the identity of particular wells 150. For example, as shown in FIGS. 1A-1D, a shape of the slide 100 can include a number of corners. Some of the corners can be regular corners 120 that have common features (e.g., right angle at intersecting surfaces). One or more of the corners can be an irregular corner 122 that has at least one feature that is different from the common feature of the regular corners 120. The resulting shape (e.g., perimeter) of the slide 100 can be asymmetric. For example, the shape of the slide 100 can be bilaterally asymmetric across one or more axes. As shown in FIG. 1D, at least a portion of the irregular corner 122 can form an angle 124 that is different (e.g., 45 degrees) from the angle formed at the regular corners 120. The location of the irregular corner 122 can be used for identifying and distinguishing the separate wells 150. For example, a reference can be provided within the well 150 that is closest to the irregular corner 122. By further example, samples can be provided to the wells 150 other than the well 150 that is closest to the irregular corner 122. At various stages before, during, and after analysis, the well 150 containing the reference can be identified based on the location of the irregular corner 122.

According to some embodiments, the slide 100 can include a substrate 110. Preferably, the substrate can transmit electromagnetic radiation, such as visible and/or infrared light, and is suitable for use in spectral analysis. The substrate 110 can be entirely of a single substrate material or a composite of multiple materials. The material of the substrate 110 can be selected for facilitating spectral analysis of a reference or sample received within wells 150 of the slide 100. For example, the material of the substrate 110 can transmit visible and/or infrared light and be substantially non-reactive with the reference and/or the sample. The substrate 110 can include a salt. The substrate 110 can include AgBr, AgCl, Al2O3, amorphous material transmitting infrared radiation ("AMTIR"), BaF2, CaF2, CdTe, water clear zinc sulfide (e.g., Cleartran™), CsI, diamond, Ge, KBr, KCl, red thallium bromoiodide ("KRS-5"), LiF, MgF2, NaCl, Si, SiO2, ZnS, ZnSe, ZrO2, and/or combinations thereof. The substrate 110 can be coated or uncoated. Slides 100 of the type described herein can be reused multiple times in separate procedures with different references and samples.

Figure 1B:
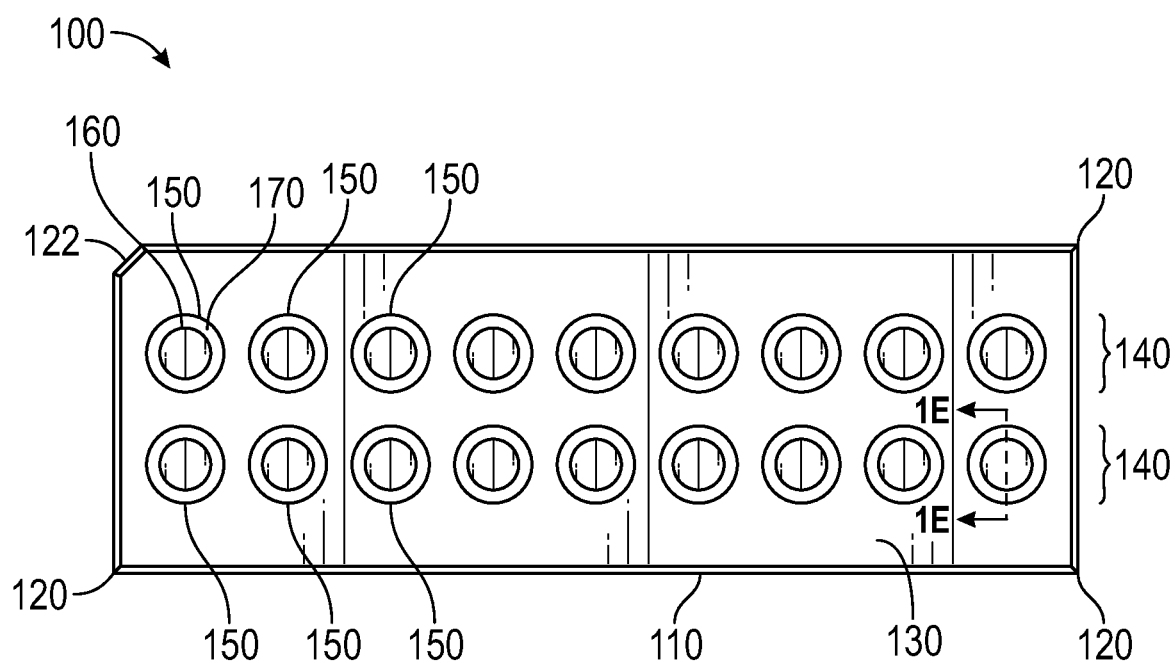
FIG. 1B shows a top view of the slide of FIG. 1A in accordance with some embodiments of the subject technology.
Figure 1C:
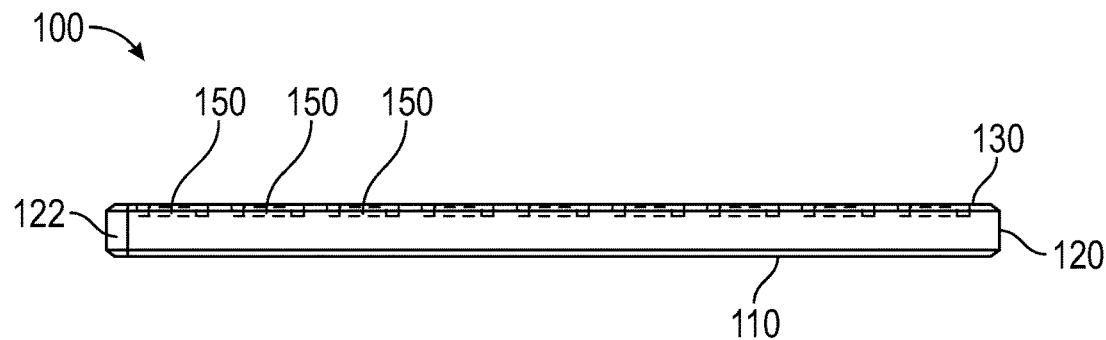
FIG. 1C shows a side view of the slide of FIG. 1A in accordance with some embodiments of the subject technology.
Figure 1D:
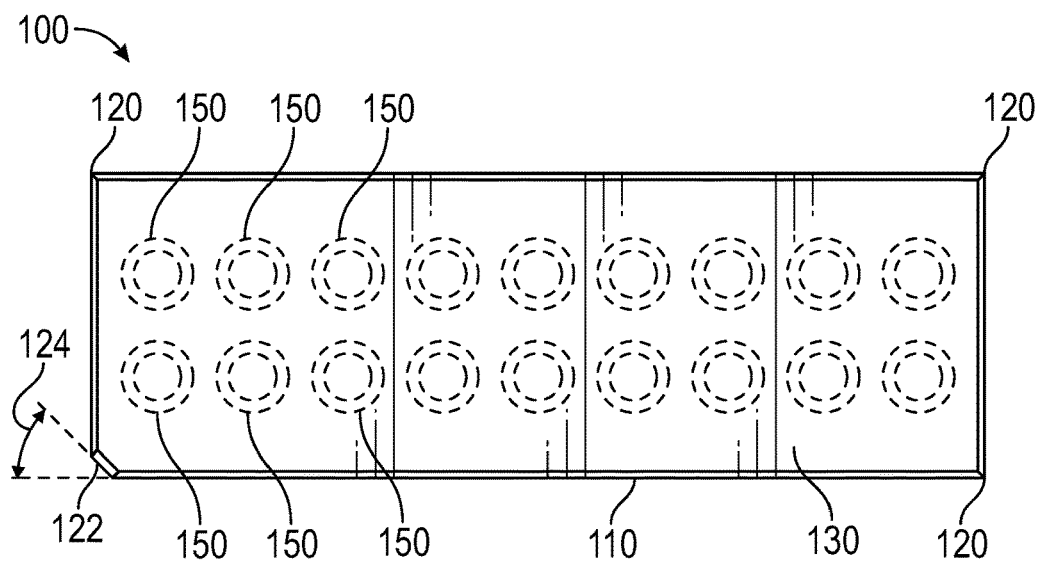
FIG. 1D shows a bottom view of the slide of FIG. 1A in accordance with some embodiments of the subject technology.
Figure 1E:
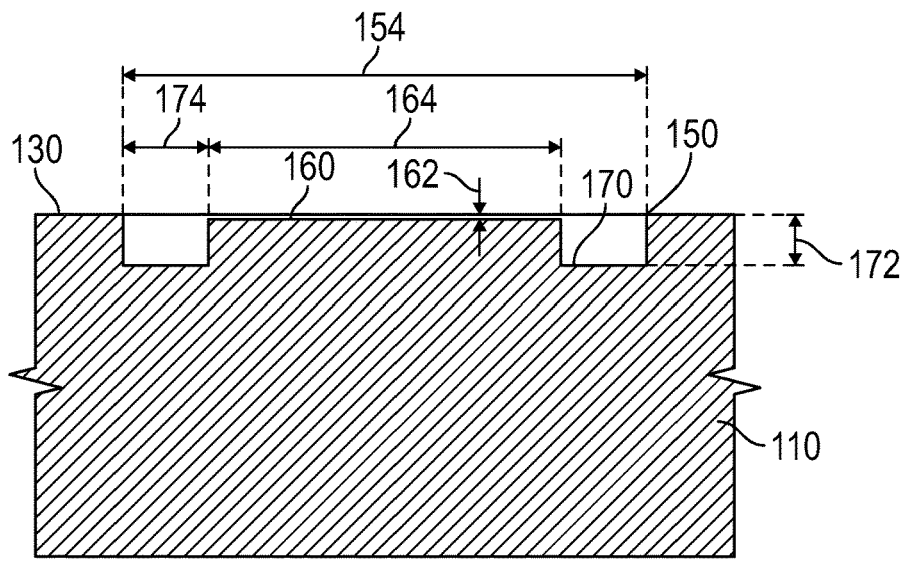
FIG. 1E shows a sectional view of a portion of the slide of FIG. 1A, including a well, in accordance with some embodiments of the subject technology.

According to some embodiments, for example as shown in FIGS. 1B and 1E, each of the wells 150 can form a sample region 160 that is recessed by a sample depth 162 from the surface 130. Each of the wells 150 can also form a trough region 170 that is recessed by a trough depth 172 from the surface 130. The trough region 170 can extend entirely about the sample region 160. For example, the sample region 160 can be concentrically within the trough region 170 with respect to an axis extending orthogonally to the surface 130. The sample region 160 and the trough region 170 can be formed by removing portions on the surface 130 of the substrate 110. For example, a milling process or other process for removing material can be applied to the surface 130 to form the sample region 160 and the trough region 170. The sample region 160 of the trough region 170 can be formed in the same or separate processes.

The sample region 160 can span an outer sample cross-sectional dimension 164 in at least one direction. A volume of a reference or sample that can be received within the sample region 160 can be defined, at least in part, by the sample depth 162 and the outer sample cross-sectional dimension 164. At least a portion of the sample region 160 can be positioned within a field of view of an imaging device 800 or other equipment.

The trough region 170 can span a trough cross-sectional dimension 174 in at least one direction. The trough cross-sectional dimension 174 can be defined by the difference between an outer trough cross-sectional dimension 154 and the outer sample cross-sectional dimension 164. A volume of a reference or sample that can be received within the trough region 170 can be defined, at least in part, by the trough depth 172 and the trough cross-sectional dimension 174. The trough depth 172 can be greater than the sample depth 162. For example, the trough depth 172 can be more than double, more than five times, or more than ten times the sample depth 162.

The outer sample cross-sectional dimension 164 can be about 2.0 mm. The sample depth 162 can be about 0.04-0.08 mm±0.01 mm ideal for $D_2O$ containing samples or 0.004-0.012 mm±0.002 mm $H_2O$ containing samples. For example, the sample depth 162 can be about 0.04 mm or about 0.07 mm. A greater sample depth 162 can facilitate a greater concentration range of proteins for analysis. The trough cross-sectional dimension 174 can be about 1.0 mm. The outer trough cross-sectional dimension 154 can be about 6.0 mm. The trough depth 172 can be about 0.60 mm. Spacing between centers of adjacent wells 150 can be greater than the outer trough cross-sectional dimension 154. These exemplary dimensions can be modified as needed to suit a given purpose.

According to some embodiments, the trough region 170 can receive an amount of a reference or sample that exceeds the volume of the sample region 160. For example, as a sample or references applied to the sample region 160, and the amount that does not fit within the sample depth 162 and the outer sample cross-sectional dimension 164 can move to the trough region 170. Such action may occur during application of the reference or sample or during application of a cover 200 to the slide 100. The trough region 170 can be of adequate volume to accommodate all excessive amounts of the reference or sample. The trough region 170 can be wide and deep enough to prevent portions of the reference or sample from overflowing out of both the sample region 160 and the trough region 170 (i.e., onto the surface 130). As such, an entire amount of the reference or sample can be contained entirely within the well 150 and prevent cross contamination with the contents of any other well 150.

Figure 2A:
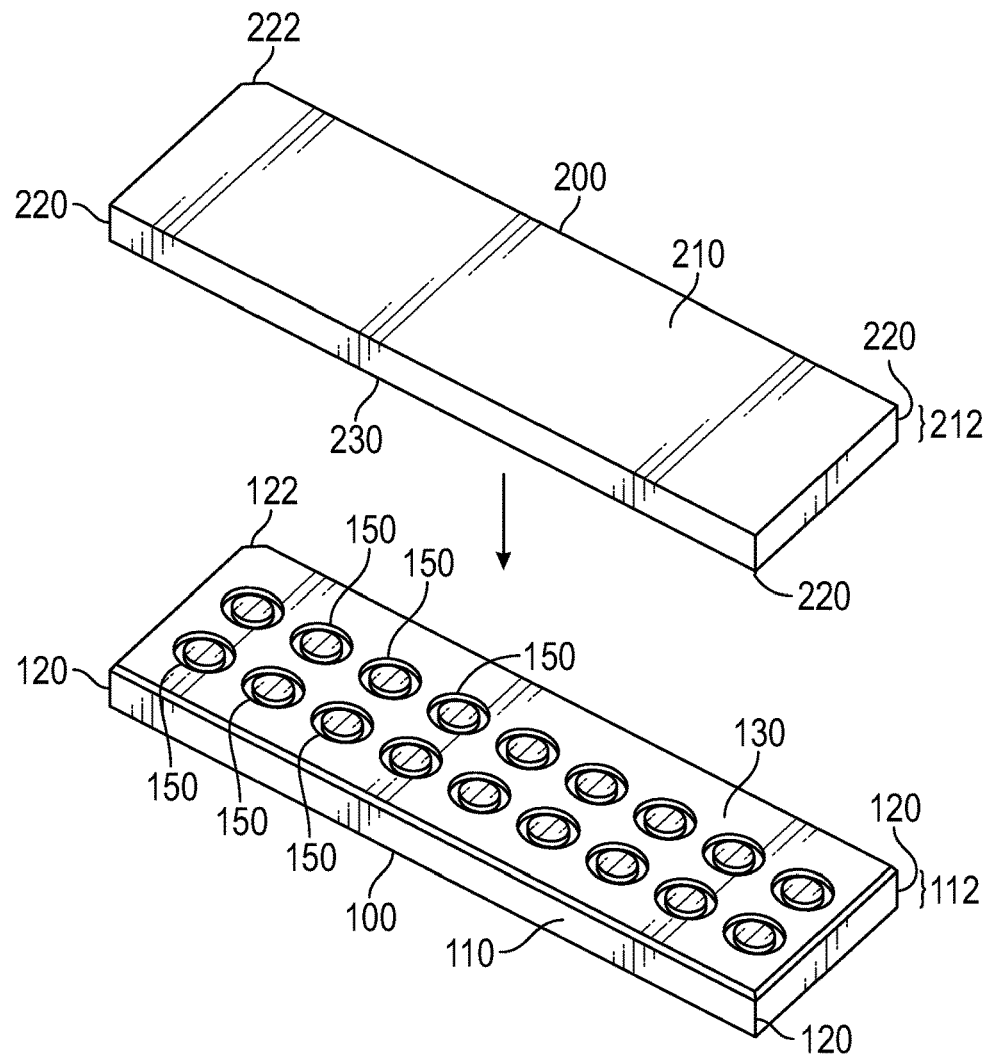
FIG. 2A shows a perspective view of a cover and the slide of FIG. 1A in accordance with some embodiments of the subject technology.
Figure 2B:
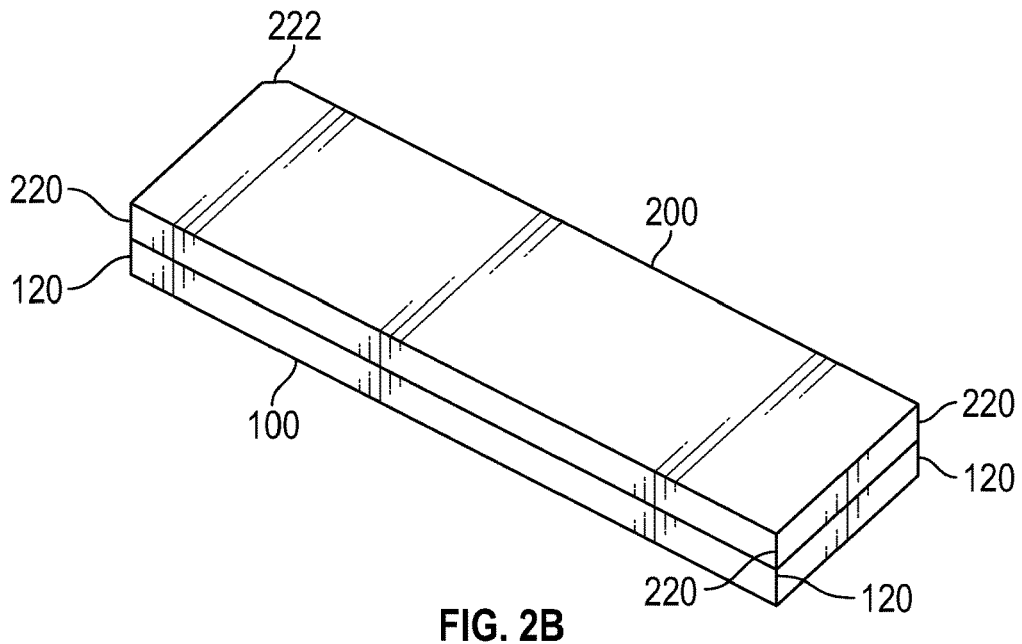
FIG. 2B shows a perspective view of the cover of FIG. 2A and the slide of FIG. 1A in accordance with some embodiments of the subject technology.
Figure 3B:
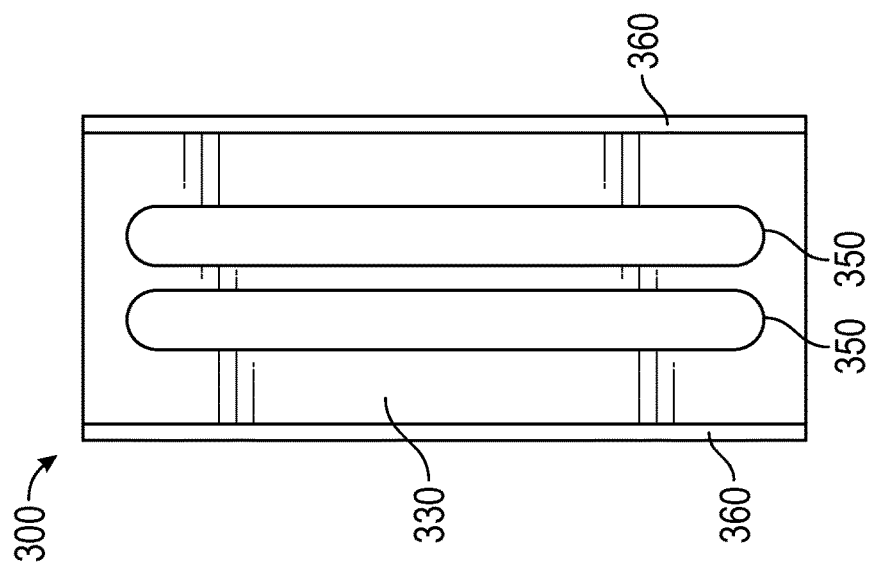
FIG. 3B shows a top view of the cap of FIG. 3A in accordance with some embodiments of the subject technology.
Figure 3D:
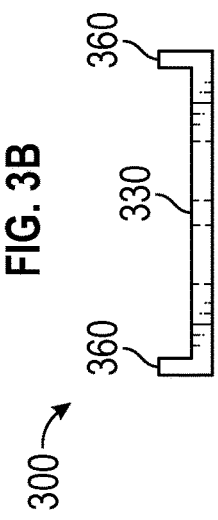
FIG. 3D shows a front side view of the cap of FIG. 3A in accordance with some embodiments of the subject technology.
Figure 3A:
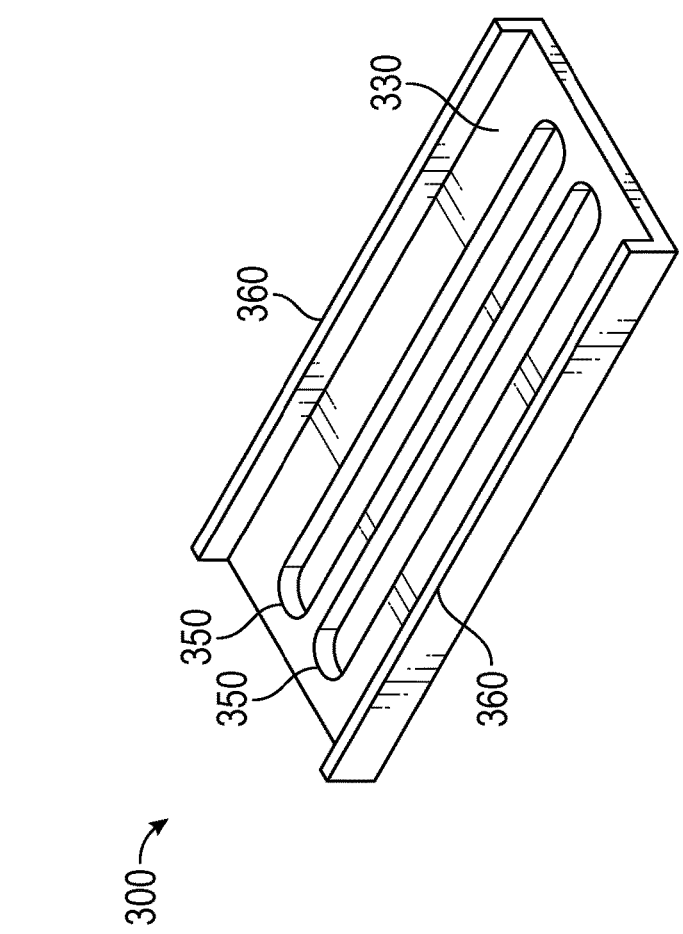
FIG. 3A shows a perspective view of a cap in accordance with some embodiments of the subject technology.
Figure 3C:
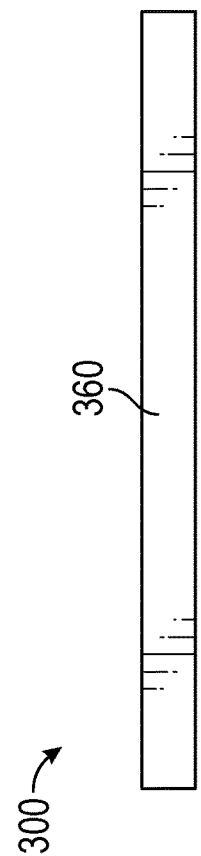
FIG. 3C shows a side view of the cap of FIG. 3A in accordance with some embodiments of the subject technology.
Figure 4A:
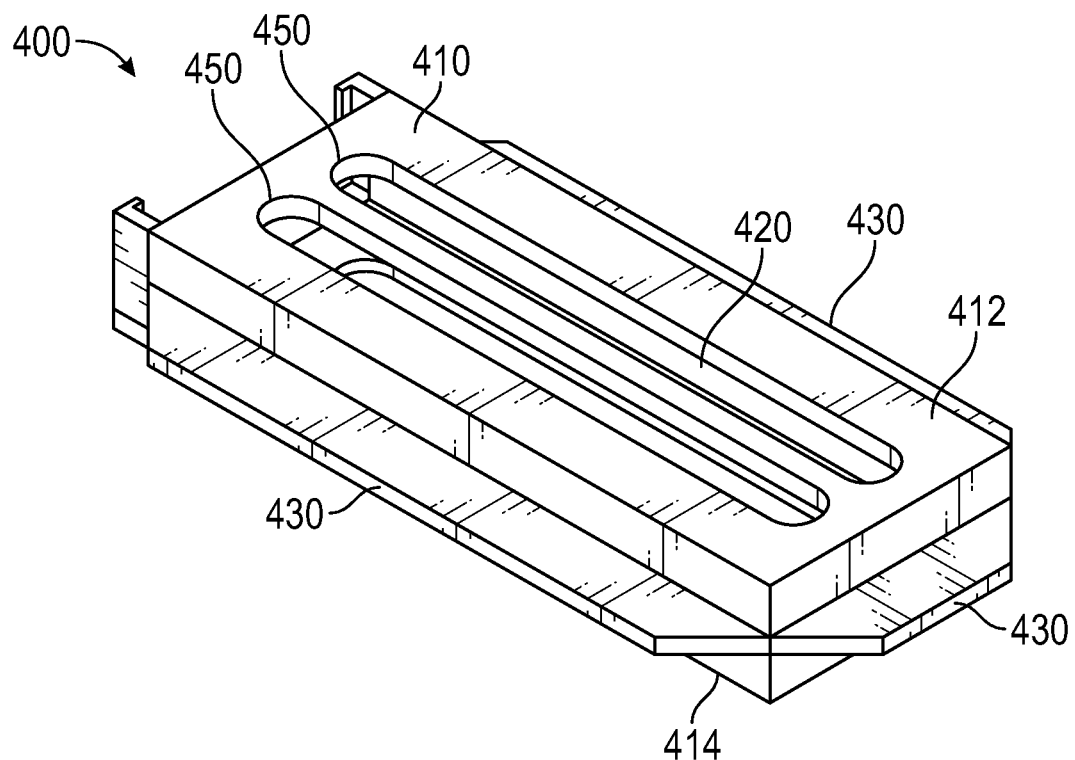
FIG. 4A shows a perspective view of a holder in accordance with some embodiments of the subject technology.
Figure 4B:
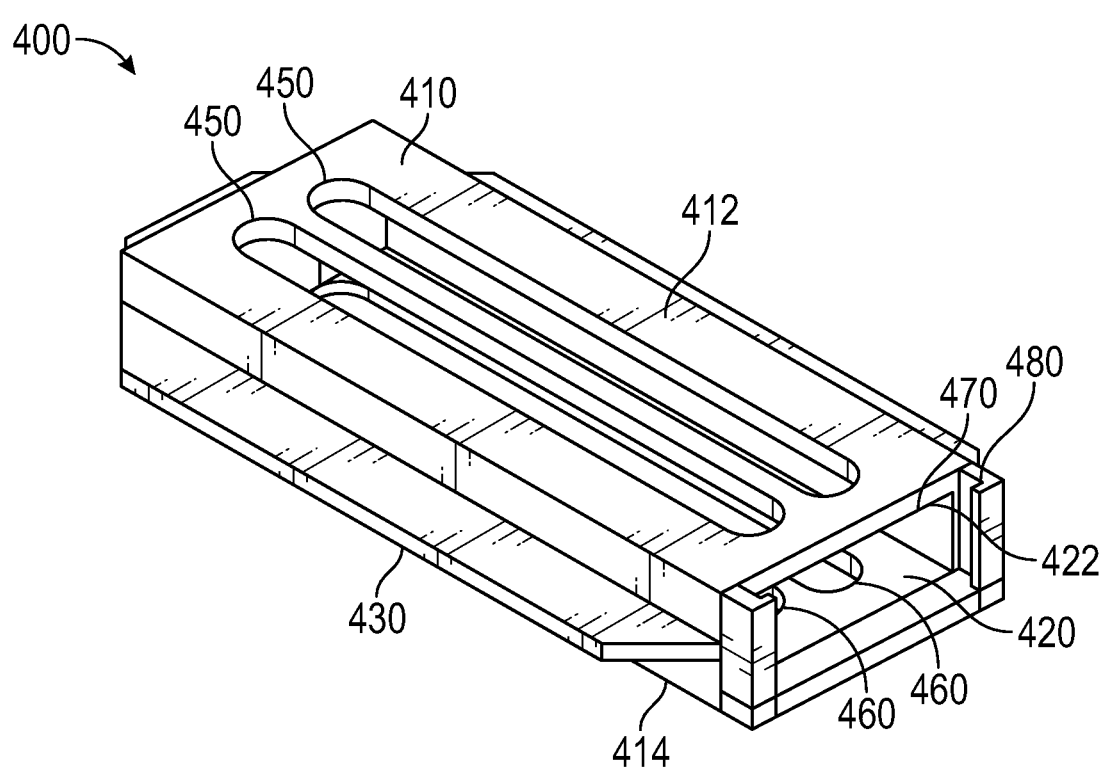
FIG. 4B shows another perspective view of the holder of FIG. 4A in accordance with some embodiments of the subject technology.
Figure 4C:
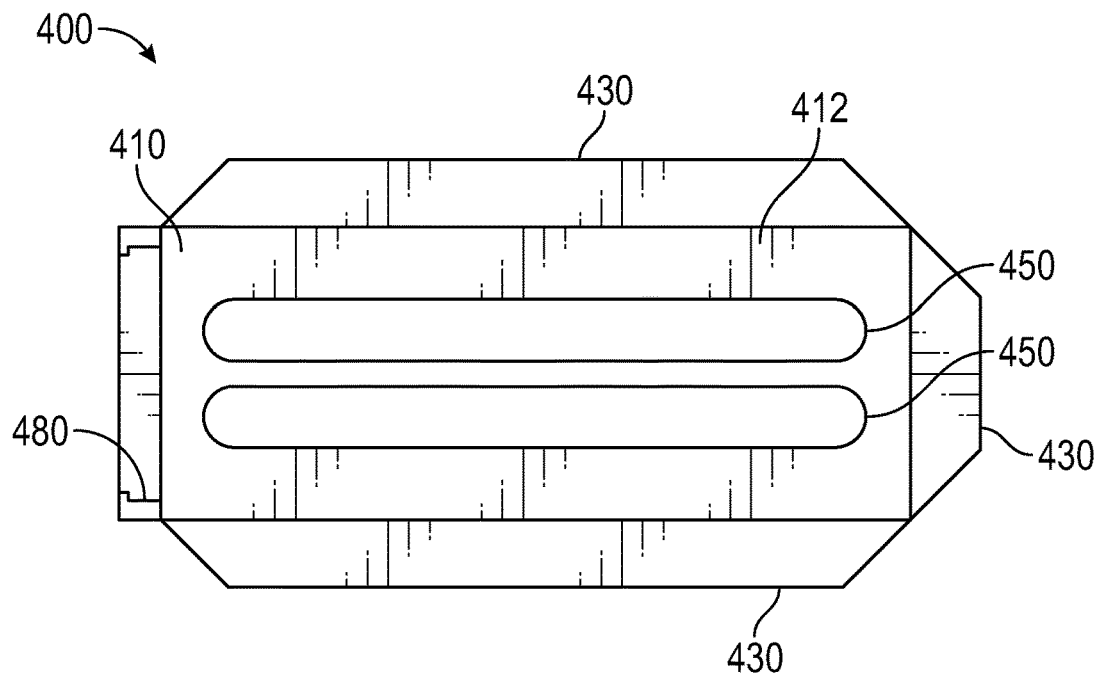
FIG. 4C shows a top view of the holder of FIG. 4A in accordance with some embodiments of the subject technology.
Figure 4D:
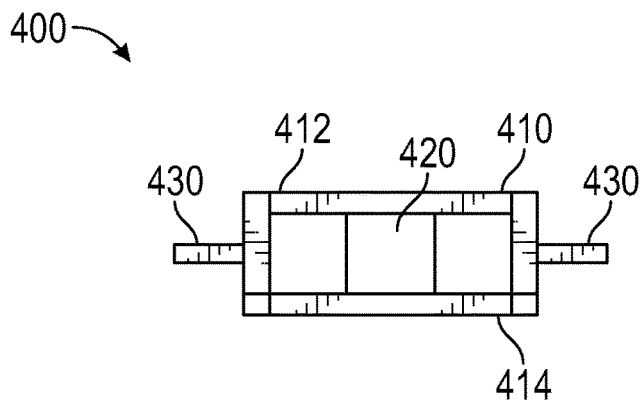
FIG. 4D shows a front view of the holder of FIG. 4A in accordance with some embodiments of the subject technology.
Figure 4E:
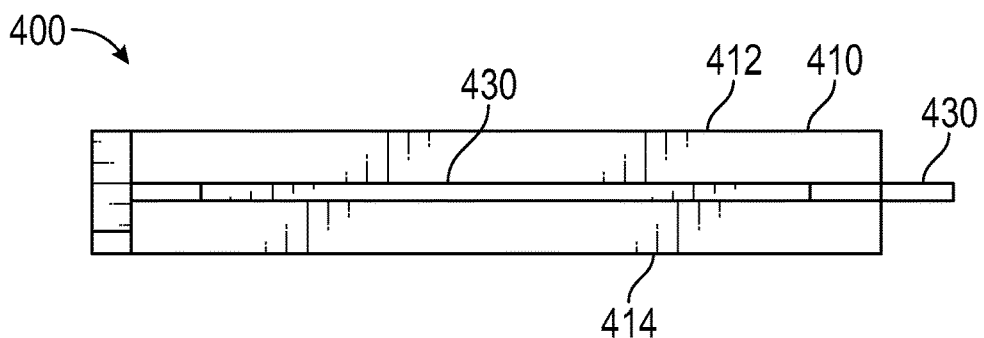
FIG. 4E shows a side view of the holder of FIG. 4A in accordance with some embodiments of the subject technology.
Figure 5B:
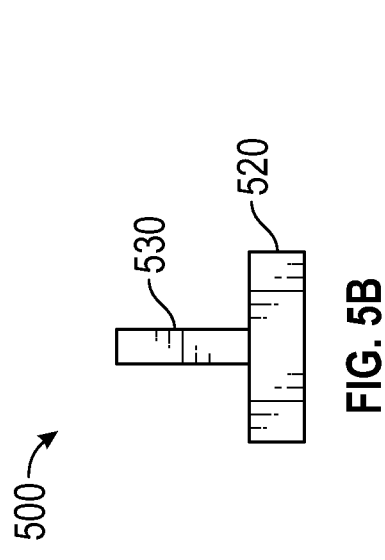
FIG. 5B shows a side view of the block of FIG. 5A in accordance with some embodiments of the subject technology.
Figure 5D:
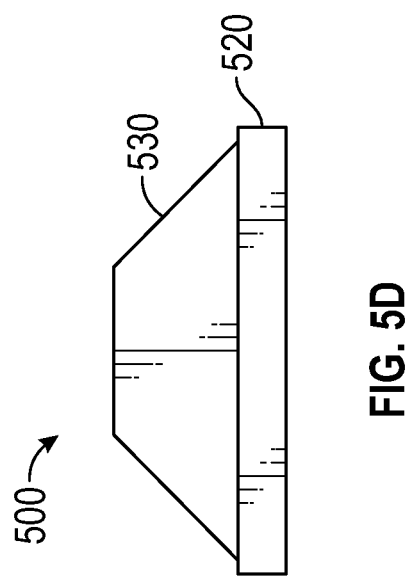
FIG. 5D shows a top view of the block of FIG. 5A in accordance with some embodiments of the subject technology.
Figure 5A:
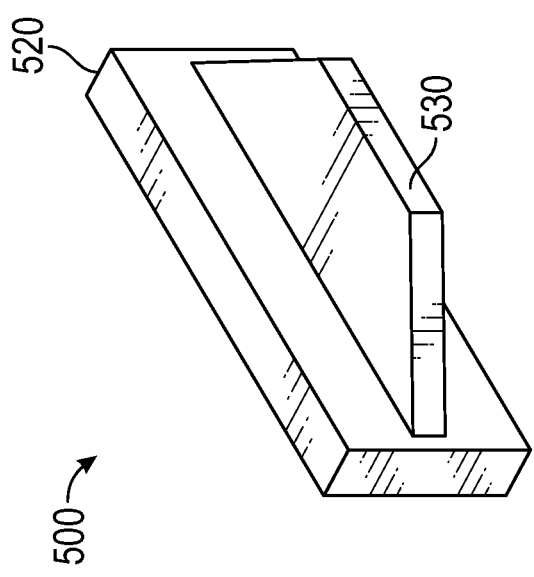
FIG. 5A shows a perspective view of a block in accordance with some embodiments of the subject technology.
Figure 5C:
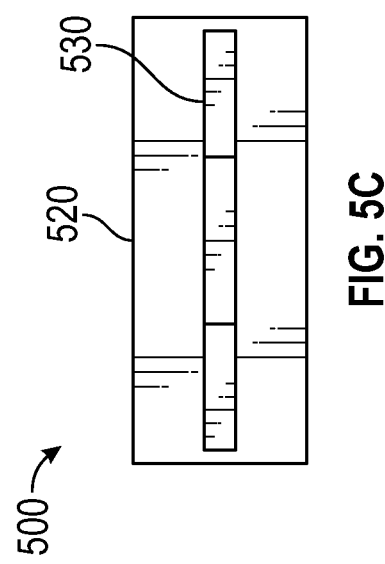
FIG. 5C shows a front view of the block of FIG. 5A in accordance with some embodiments of the subject technology.

According to some embodiments, for example as shown in FIGS. 2A-2B, a cover 200 can be applied to the slide 100. An opposing surface 230 of the cover 200 can be substantially flat or planar. Some features of the cover 200 can be complementary or identical to features of the slide 100. For example, a shape of the cover 200 can include a number of corners. Some of the corners of the cover 200 can be regular corners 220 that are identical or similar to the regular corners 120 of the slide 100. One or more of the corners of the cover 200 can be an irregular corner 222 that are identical or similar to the irregular corner 122 of the slide 100. The resulting shape (e.g., perimeter) of the cover 200 can be identical or similar to the shape (e.g., perimeter) of the slide 100.

According to some embodiments, the cover 200 can include a substrate 210. Preferably, the substrate can transmit electromagnetic radiation, such as visible or infrared light, and is suitable for use in spectral analysis. The substrate 210 can be of the same material as or a different material from that or the substrate 110 of the slide 100. The material of the substrate 210 can be selected for facilitating spectral analysis of a reference or sample received within wells 150 of the slide 100. For example, the material of the substrate 210 can transmit visible and/or infrared light and be substantially non-reactive with the reference and/or the sample. Covers 200 of the type described herein can be reused multiple times in separate procedures with different references and samples.

The opposing surface 230 of the cover 200 can be brought into contact with the surface 130 of the slide 100. In such a configuration, the opposing surface 230 can be parallel to or coplanar with the surface 130. When the cover 200 is brought into contact with the slide 100, the opposing surface 230 can extend over one or more of the wells 150 of the slide 100. The opposing surface 230 can enclose each of the wells 150, such that each well 150 is isolated from an external environment and from every other well 150. The cover 200 can prevent evaporation of the reference or sample from the well 150. The boundary of each of the sample region 160 and the trough region 170 can be defined, in part, by the opposing surface 230. Application of the cover 200 to the slide 100 can cause at least a portion of a reference or sample within the sample region 160 to move into the trough region 170.

The cover 200 can define a cover thickness 212 in a dimension that is orthogonal to the opposing surface 230. Additionally, the slide 100 can define a slide thickness 112 and a dimension that is orthogonal to the surface 130. The cover thickness 212 can be equal to or substantially equal to the slide thickness 112. As used herein, a substantially equal thickness is one that varies from exactly equal within a tolerance that is typical for an applicable manufacturing process.

According to some embodiments, for example as shown in FIGS. 3A-3D, a cap 300 can be provided for conduction of heat across portions of the slide 100 and/or the cover 200. The cap 300 can include a cap surface 330 that is substantially flat or planar. One or more support rails 360 can protrude from the cap surface 330. One or more cap fenestrations 350 can extend through a portion of the cap 300, including the cap surface 330. The one or more cap fenestrations 350 can form windows that are each configured to be aligned with a corresponding one of the rows 140 of the slide 100. The number of cap fenestrations 350 can be equal to the number of rows 140 of the slide 100. Each of the cap fenestrations 350 can span a length that encompasses all of the wells 150 of the corresponding row 140. The one or more cap fenestrations 350 provide transmission of electromagnetic radiation to and/or from the wells 150 of the slide 100. Heat can be transmitted between the cap 300 and adjacent components. At least a portion of the cap 300 can be of a material with high thermal conductivity. Exemplary materials for the body 410 include aluminum, polytetrafluoroethylene ("PTFE"), brass, bronze, copper, silver, gold, and other metal alloys or ceramic.

According to some embodiments, for example as shown in FIGS. 4A-4E, a holder 400 can contain and support the slide 100 and/or the cover 200. A body 410 of the holder 400 can define a cavity 420 between a first side 412 and a second side 414 of the body 410. A port 470 provides access to the cavity 420 for receiving the slide 100 and/or the cover 200 into the cavity 420.

According to some embodiments, one or more first fenestrations 450 can extend through a portion of the first side 412 of the body 410. One or more second fenestrations 460 can extend through a portion of the second side 414 of the body 410. The first fenestrations 450 and/or the second fenestrations 460 can form windows that are each configured to be aligned with a corresponding one of the rows 140 of the slide 100 when the slide 100 is placed in the holder 400. The number of first fenestrations 450 and/or the number of second fenestrations 460 can be equal to the number of rows 140 of the slide 100. Each of the first fenestrations 450 and/or the second fenestrations 460 can span a length that encompasses all of the wells 150 of the corresponding row 140. The first fenestrations 450 and/or the second fenestrations 460 provide transmission of electromagnetic radiation to and/or from the wells 150 of the slide 100.

According to some embodiments, the cavity 420 of the holder 400 is sized such that an inner surface 422 of the holder contacts at least a portion of the slide 100 and/or the cover 200. The inner surface 422 can provide thermal contact with at least one of the slide 100 and/or the cover 200. For example, the inner surface 422 on the first side 412 can contact the cover 200 and the inner surface 422 on the second side 414 can contact the slide 100. Heat can be transmitted between the holder 400 and its contents. At least a portion of the body 410 of the holder 400 can be of a material with high thermal conductivity, sturdy construction, and low-electromagnetic radiation (e.g., visible light, infrared light, quantum cascade laser) reflection. Exemplary materials for the body 410 include anodized aluminum, PTFE, bronze, and copper. The holder 400 can absorb a substantial amount of electromagnetic radiation that is incident thereon. For example, the holder 400 can absorb at least 90%, at least 95%, or at least 99% of the electromagnetic radiation that is incident thereon. As the holder 400 absorbs more electromagnetic radiation than it reflects, the holder 400 reduces interference with accurate readings during a spectral analysis. At least a portion of the inner surface 422 can be provided with a coating to reduce or eliminate damage to the contents of the holder 400 when moving or residing therein. Exemplary materials for the coating include silicone.

According to some embodiments, one or more extensions 430 can be provided at an outer periphery of the holder 400. The extensions 430 can provide guidance and slideable engagement with a portion of other equipment for aligning the reference and samples within a field view of an imaging device 800.

According to some embodiments, the port 470 can be provided on any side of the holder 400. For example, the port 470 can be provided on a side of the holder 400 that has a length shorter than at least one other side of the holder 400. Alternatively or in combination, the port 470 can be provided on a side of the holder 400 that has a length longer than at least one other side of the holder 400. The port 470 can be adjacent to a receptacle 480 for receiving a block 500. The receptacle 480 can include a groove, recess, channel, rail, or other guide for receiving the 502 partially or entirely obstructing the port 470.

According to some embodiments, for example as shown in FIGS. 5A-5D, a block 500 can be used to secure items within the cavity 420 of the holder 400. The block 500 may include a barrier 520 configured to fit within the receptacle 480 of the holder 400. The barrier 520 can be further configured to partially or entirely obstruct the port 470, such that contents within the cavity 420 of the holder 400 remain within the cavity 420 until the block 500 is removed. For example, the slide 100 and/or the cover 200 can be secured within the cavity 420 while the block 500 is within the receptacle 480. The block 500 can also include a handle 530 for use during operation by a user.

Figure 6A:
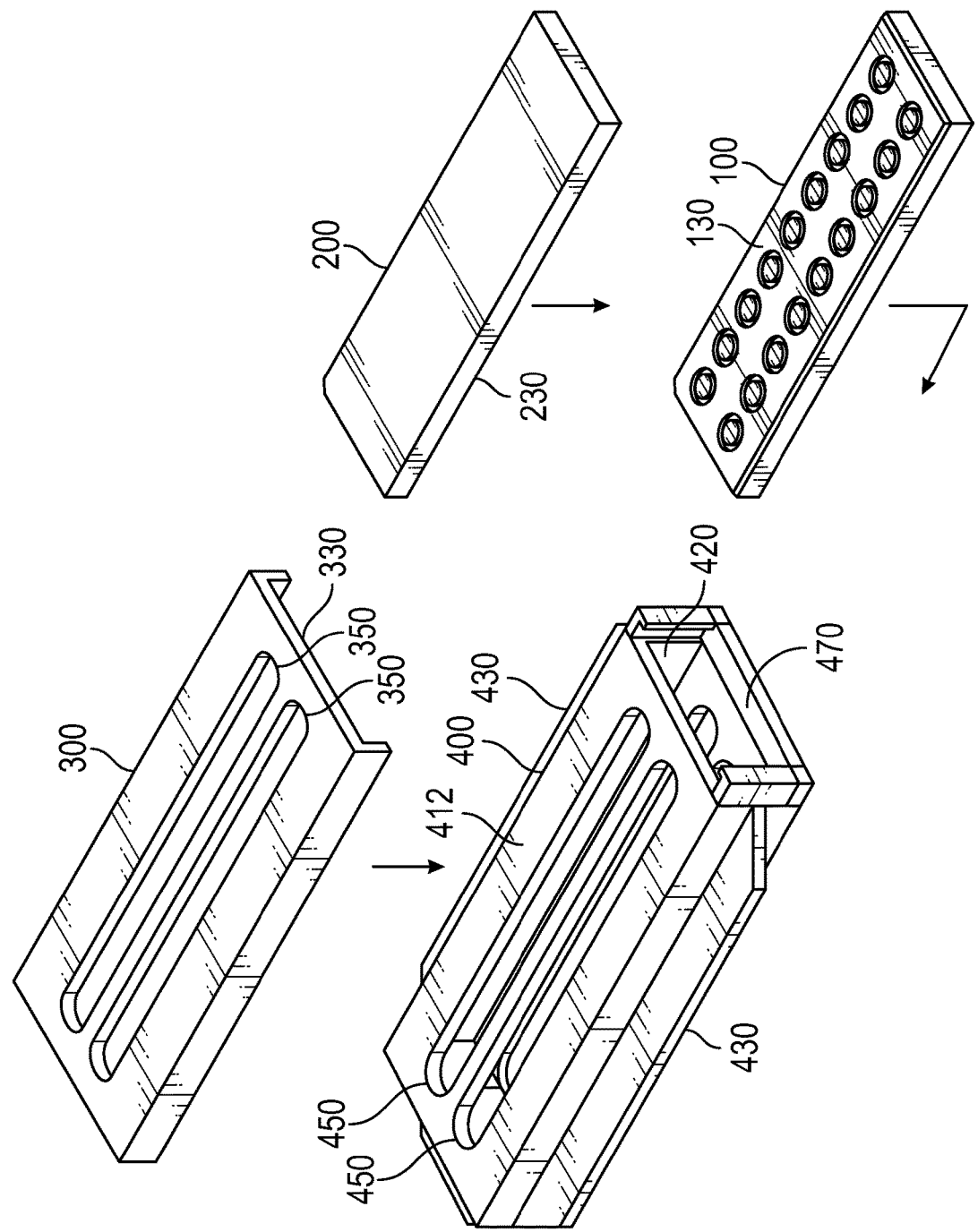
FIG. 6A shows a perspective view of the slide of FIG. 1A, the cover of FIG. 2A, the cap of FIG. 3A, and the holder of FIG. 4A in accordance with some embodiments of the subject technology.
Figure 6B:
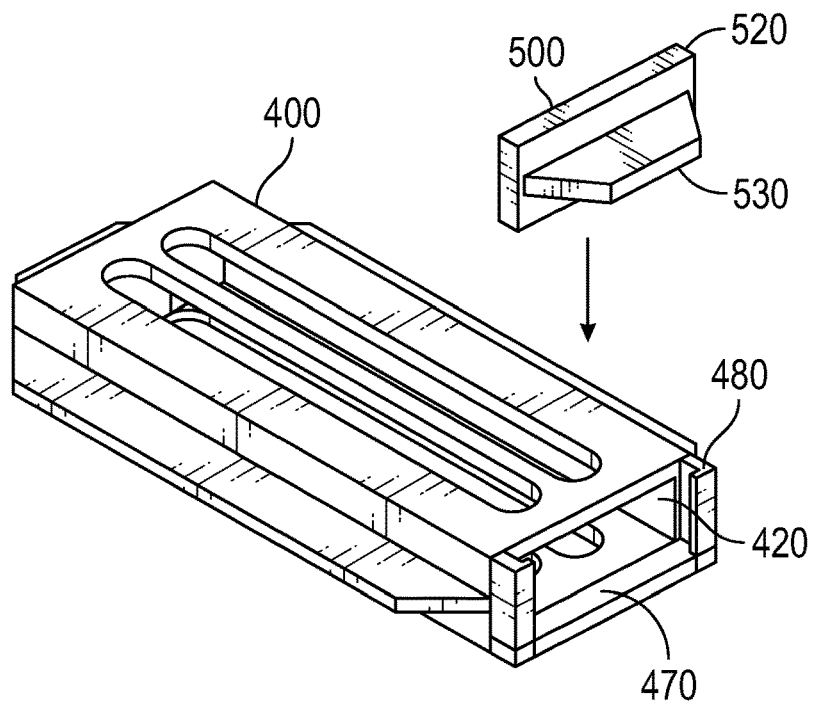
FIG. 6B shows a perspective view of the holder of FIG. 4A and the block of FIG. 5A in accordance with some embodiments of the subject technology.

According to some embodiments, for example as shown in FIGS. 6A-6B, an assembly can be formed of the components described herein. One or more references and samples are provided to each of a plurality of wells 150 formed in the slide 100. The wells 150 are enclosed by applying the cover 200 to of the slide 100. For example, the opposing surface 230 of the cover 200 can be applied to the surface 130 of the slide 100. The slide 100 and/or the cover 200 can be inserted through the port 470 and into the cavity 420 of the holder 400. According to some embodiments, the cap 300 can be applied to the holder 400. For example, the Surface 330 can be applied to a side of the holder 400, such as the first side 412. In such a configuration, the cap fenestrations 350 can be aligned with the first fenestrations 450. At least one of the support rails 360 of the cap 300 can contact and/or rest on one or more of the extensions 430 of the holder 400. The cap 300 can be in thermal contact with one or more sides of the holder 400 to facilitate heat distribution across the holder 400. The cap 300 can provide thermal control through intimate contact with an etched foil that is equipped with resistance temperature detectors, thermocouples, and/or other sensors. Features (e.g., thermocouples and/or sensors) of the cap 300 can be connected to one or more control components, such as a PLC controller. By heating in a homogeneous fashion, the cap 300 allows a continuous and gradient-free heat transfer along a region of contact with the holder 400. The cap 300 can shield the holder 400 from a cool draft of a microscope purge. One or more of the features of the cap 300, as described herein, can be provided exclusively on the cap 300 and not on the holder 400, such that the one or more features can be omitted when the holder 400 is used without the cap 300. Additionally, features of the cap 300 connecting to other components of the system (e.g., PLC controller, etc.) can remain connected to a cap 300 while various holders 400 can each be used in conjunction with the cap 300 without requiring connection and disconnection of the features. According to some embodiments, with the contents (not shown in FIG. 6B) within the cavity 420 of the holder 400, the block 500 can be inserted into the receptacle 480 of the holder 400 to secure the contents within the cavity 420.

The cap 300 can include an etched foil heater that controls the temperature of samples in the slide. The etched foil heater spans a surface of the cap 300. A foil layer of the heater can be between one or both of a base laminate layer and a cover laminate layer. The laminate layers can include a dielectric material (e.g., polyimide) for electrically isolating the etched foil from the cap 300 and/or other structures. The etched foil can have a pair of terminals with leads on a side of the cap 300 that allow a user to connect a power supply (e.g., DC power) to the etched foil heater. Between the terminals, the etched foil heater can define a pathway that traverses the cap 300. For example, the pathway can extend about and between each and every one of the cap fenestrations 350. The etched foil heater can distribute heat evenly across the cap 300 and thereby transfer heat evenly to the slide, so that temperature gradients across the cap 300 and the slide are reduced or eliminated. The etched foil heater can have a temperature threshold, above which the heater activity will cease automatically. According to some embodiments, a base (not shown) similar to the cap 300 can be provided for application to the cover 200. The base can be provided on a side of the cover opposite the cap 300. The base can be a mirror image of the cap 300 and have features that are identical to that of cap 300. For example, the base can include fenestrations that align with the second fenestration 460. By further example, the base can include an etched foil heater.

Figure 6C:
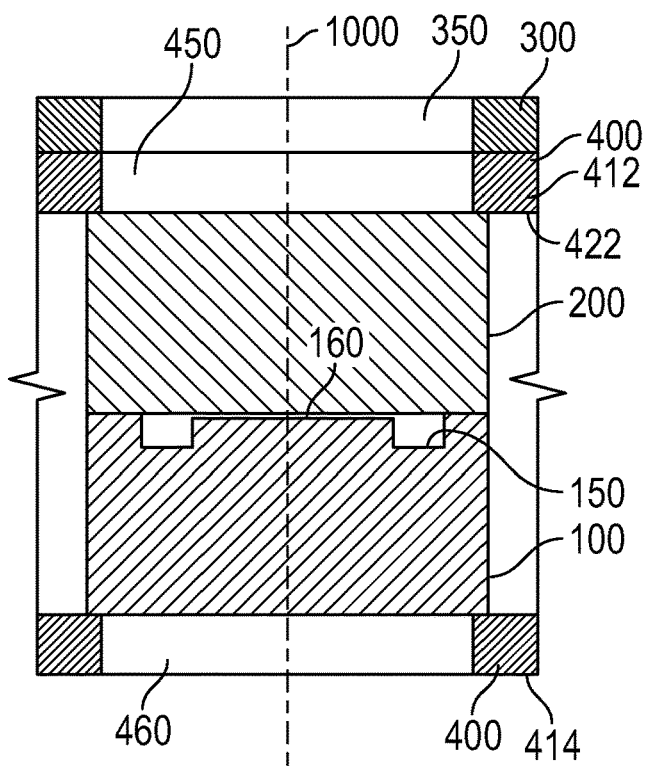
FIG. 6C shows a sectional view of portions of the slide of FIG. 1A, the cover of FIG. 2A, the cap of FIG. 3A, and the holder of FIG. 4A in accordance with some embodiments of the subject technology.

According to some embodiments, for example as shown in FIG. 6C, the components described herein can be stacked to align a reference or sample with an imaging axis 1000. Along the imaging axis 1000, the cap fenestration 350, the first fenestration 450, the cover 200, the slide 100 (including the sample region 160), and/or the second fenestration 460 can be aligned. Electromagnetic radiation can be transmitted through each of the above components in either or both directions along the imaging axis 1000.

Figure 7:
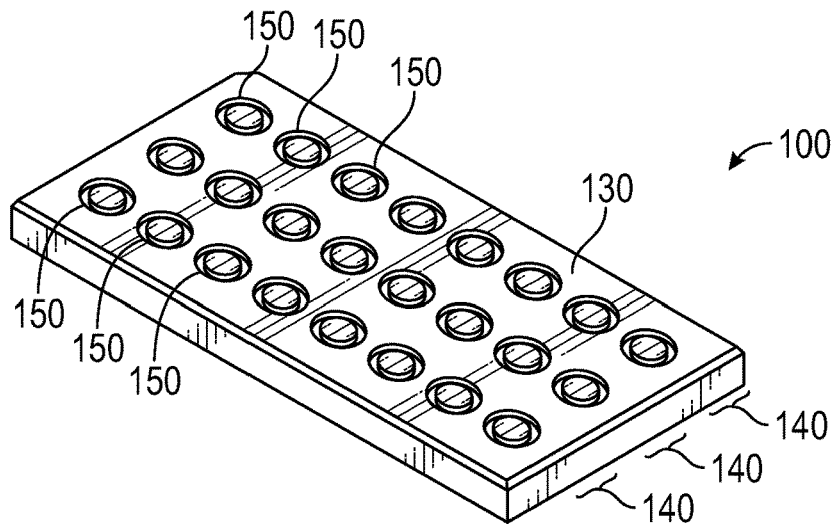
FIG. 7 shows a perspective view of a slide in accordance with some embodiments of the subject technology.
Figure 8:
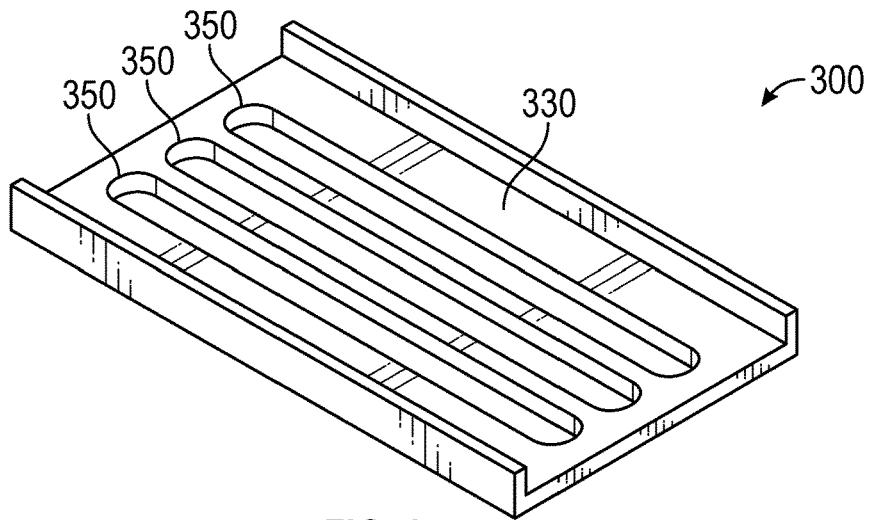
FIG. 8 shows a perspective view of a cap in accordance with some embodiments of the subject technology.
Figure 9:
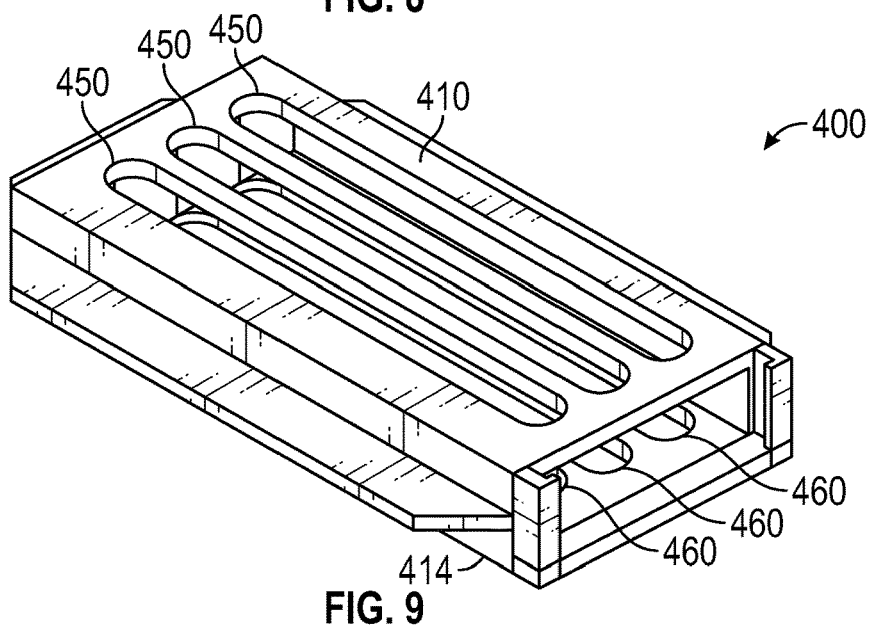
FIG. 9 shows a perspective view of a holder in accordance with some embodiments of the subject technology.

According to some embodiments, for example as shown in FIGS. 7-9, any number of samples can be evaluated by providing an appropriate number of wells in a slide and corresponding structures to accommodate the wells. For example, as shown in FIG. 7, the slide 100 can include a substrate that forms a plurality of wells 150 provided in separate rows 140. As shown in FIG. 7, three rows 140 can be provided. For example, a first row 140 can include a first number of wells 150, a second row 140 can include a second number of wells 150, and a third row 140 can include a third number of wells 150. The rows 140 can include the same number of wells 150 or different numbers of wells 150. According to some embodiments, the cap 300 can include a number of cap fenestrations 350 that corresponds to the number of rows 140 of the slide 100. For example, three cap fenestrations 350 can form windows that are configured to be aligned with the three rows 140 of the slide 100. According to some embodiments, the holder 400 can include a number of first fenestrations 450 and second fenestrations 460 that that correspond to the number of rows 140 of the slide 100. For example, three first fenestrations 450 and three second fenestrations 460 can form windows that are configured to be aligned with the three rows 140 of the slide 100.

Figure 10A:
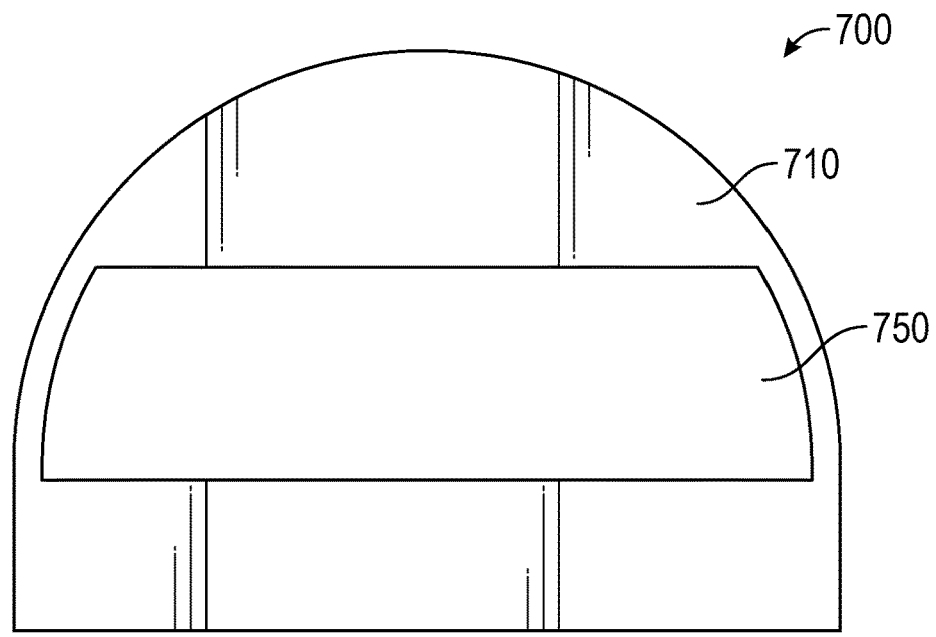
FIG. 10A shows a top view of a plate in accordance with some embodiments of the subject technology.
Figure 10B:
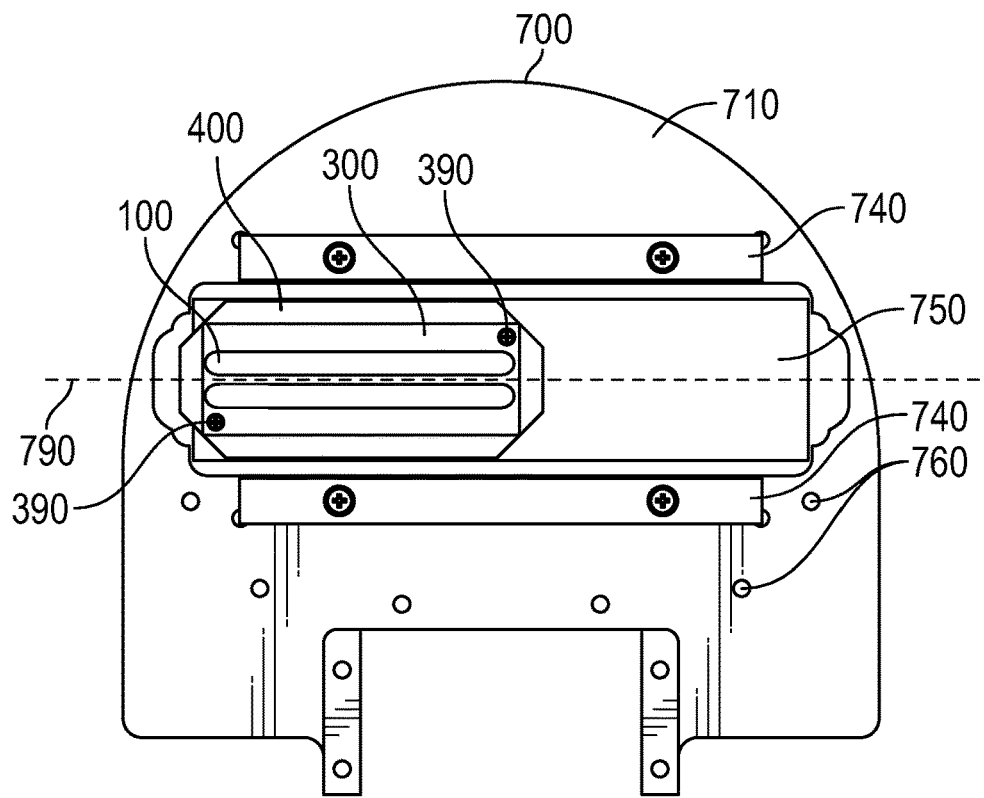
FIG. 10B shows a top view of the holder of FIG. 4A and the plate of FIG. 7A in accordance with some embodiments of the subject technology.
Figure 11:
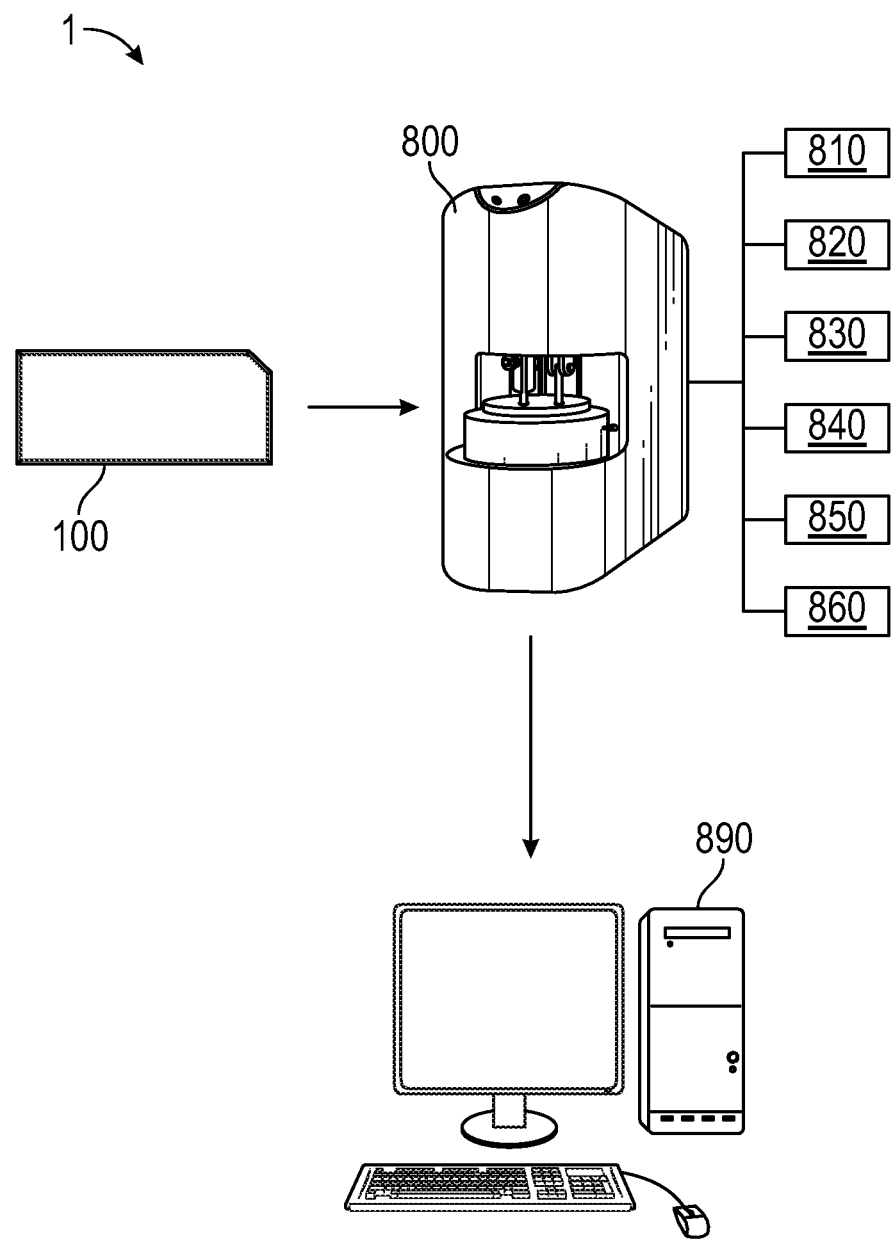
FIG. 11 shows a schematic view of the holder of FIG. 4A and the plate of FIG. 7A in accordance with some embodiments of the subject technology.

According to some embodiments, for example as shown in FIGS. 10A-11, a plate 700 can receive the holder 400, its contents, and/or the cap 300. The plate 700 can be a component of an imaging device 800 or be configured to attach to an imaging device 800 during operation thereof. The imaging device 800 can include a microscope, a camera, a mirror, a lens, quantum cascade lasers, or an infrared source with a beam splitter, a detector, a sensor, or combinations thereof. The imaging device 800 can be configured to capture information regarding electromagnetic radiation incident upon the reference or sample within the sample region 160. The plate 700 can include a body 710 and a window 750 that transmits electromagnetic radiation to or from the slide 100. At the location of the window 750, the plate 700 can provide a recessed region for receiving the holder 400.

According to some embodiments, the plate 700 can facilitate alignment to bring the sample region 160 within a field of view and a focal length and/or focal plane of the imaging device 800. For example, the plate 700 can include one or more guide 740 for receiving the holder 400. At least a portion of the holder 400, such as the extensions 430, can be received within the guides 740. The holder 400 can move along a positioning axis 790. The positioning axis 790 can be parallel to one or more of the rows 140 of the slide 100. As the holder 400 is moved along the positioning axis 790, a selected one or more of the sampling regions 160 can be aligned to be within a field of view of the imaging device 800. The holder 400 can move along the positioning axis 790 manually or by an automated or programmed mechanism 810, such as a servo-motor and/or stepper motor. The mechanism 810 can be controlled by a controller, such as the controller connected to the cap 300. For a variety of positions of the holder 400 within the plate 700, the sample region 160 that is within a field of view of the imaging device 800 will be a fixed and consistent distance (e.g., focal distance) from a reference point (e.g., electromagnetic radiation source). Accordingly, a fixed path length for an electromagnetic radiation beam can be determined and maintained throughout a procedure in which multiple references and/or samples are analyzed.

According to some embodiments, the path length for an electromagnetic radiation beam can vary for multiples samples in multiple wells of a slide. The path length can vary to ensure that sample concentration is the same or similar for different samples. The path length can be determined based on the Beer-Lambert law (or Beer's law), which demonstrates the linear relationship between absorbance and concentration of an absorbing species. The general Beer-Lambert law is usually written as:

$$A = \varepsilon(\lambda) * b * c,$$

where A is the measured absorbance, $\varepsilon(\lambda)$ is a wavelength-dependent absorptivity coefficient, b is the path length, and c is the analyte concentration. When working in concentration units of molarity, the Beer-Lambert law is written as:

$$A = \varepsilon * b * c,$$

where $\varepsilon$ is the wavelength-dependent molar absorptivity coefficient with units of $M^{-1} cm^{-1}$. Experimental measurements can be made in terms of transmittance (T), which is defined as:

$$T = I/I_0$$

where I is the light intensity after it passes through the sample and $I_0$ is the initial light intensity. The relation between A and T is:

$$A = -\log T = -\log(I/I_0).$$

Modern absorption instruments can usually display the data as either transmittance, %-transmittance, or absorbance. An unknown concentration of an analyte can be determined by measuring the amount of light that a sample absorbs and applying Beer's law. If the absorptivity coefficient is not known, the unknown concentration can be determined using a working curve of absorbance versus concentration derived from standards.

Calibration of path lengths (i.e., well depths) for wells of a slide can be performed, for example, by analyzing absorbance results. Where the measurements of absorbance can be linearly correlated with the known path lengths and where deviations from this correlation are observed, corrections to the path lengths can be made to account for the lack of linearity. The variable path lengths can then compensate for the deviations from the linear correlation, so that further tests during a calibration stage provide results that are consistent with the linear correlation.

The plate 700, for example as shown in FIG. 10B, can include features (e.g., recesses 760) to accommodate other components of the sampling system 1, for example as shown in FIG. 11, such as heating elements 830, cooling elements 840 (e.g., Peltier, embedded microfluidic/TEG system), and/or temperature sensors 850 (e.g., thermocouples) to uniformly heat and monitor temperature conditions of the plate 700. The plate 700 can also be provided with humidity sensors 860 for determining a humidity level in a sampling compartment of the imaging device 800. Alternatively or in combination, the cap 300 and/or the holder 400 can include features (e.g., recesses 390) to include heating elements, cooling elements (e.g., Peltier), temperature sensors (e.g., thermocouples), and/or connection ports connecting to one or more of the above to uniformly heat and monitor temperature conditions of the holder 400 and/or its contents. Output of one or more sensors of the system can provide data to a controller 820, such as a Peripheral Interface Controller ("PIC") microcontroller. Temperature conditions can be regulated by the controller 820 based on data from sensors. The controller 820 can further control operation of any heat elements are cooling elements to provide uniform temperature conditions across the slide 100. Heat can be transmitted across the plate 700, the holder 400, and/or its contents. At least a portion of the body 710 of the plate 700 can be of a material with high thermal conductivity, sturdy construction, and low electromagnetic radiation reflection. Exemplary materials for the body 710 include anodized aluminum, PTFE, bronze, and copper.

The controller 820 can raise or lower temperatures in multiple (e.g., 3 or more) positions according to a user defined instructions and/or inputs. Once a target temperature has been reached, the assembly (e.g., holder 400) can move to a first measuring position. Multiple (e.g., 3 or more) measuring positions can be achieved to capture information with respect to all wells in the assembly. At a given target temperature, a measuring cycle can include of the following steps: (1) reach correct temperature in all heaters; (2) send a "ready to measure" signal to the microscope; (3) wait until the microscope returns an "end of measurement" signal; (4) move the assembly to the next position. Relative humidity and temperature for each well can be measured and recorded. The system can control a servo or stepper motor to move the assembly through appropriate well alignments. Each position can be maintained for a time specified as part of the experiment parameters. The limits of assembly movement can be indicated by end limit switches. The controller 820 can sense and be provided with an indication when the target well is in position for measurement. The controller 820 can provide a user interface for a user to enter and modify one or more target temperatures and/or other parameters for an experiment. A full cycle can include ascending temperatures and/or descending temperatures. The controller 820 can include a feature that provides an indication (e.g., alarm) to a user based on occurrence of particular conditions, such as failure to maintain temperature during measurements and/or failure to maintain relative humidity within a range.

According to some embodiments, multiple (e.g., four) different zones will define the sampling array of the sampling system 1 which will be fully automated with the servo-motor to allow for the advancement of the holder 400 through the field of view of the imaging device 800. The control of the servo-motor to predefined positions and the cycling thereof can be facilitated by a controller 820. Thus, data acquisition can be fully automated along with temperature control of the holder 400 and its contents.

According to some embodiments, multiple data acquisition stages can be performed in which a plurality of references and/or samples are evaluated under a first set of conditions (e.g., temperature, humidity, etc.), followed by a change in the conditions and further evaluation of at least some of the same references and/or samples under the new conditions.

According to some embodiments, additional data acquisition stages can be performed in which the plurality of references and/or samples are returned to the first set of conditions (e.g., temperature, humidity, etc.), followed by further evaluation to assess reversibility under one or more condition dependencies (e.g., thermal dependency).

According to some embodiments, the sampling system 1 described herein can be used for determining the mechanism of aggregation and the amount of aggregation in protein, peptide or peptoid formulation, in solution or lyophilized state without the use of probes or additives by performing a Fourier transform infrared ("FT-IR") and two-dimensional correlation analysis ("2DCOS") analysis, for example as described in U.S. Pat. No. 8,268,628, hereby incorporated herein by reference. Such analysis can be performed by a computing system 890. FT-IR spectroscopy allows for a high degree of flexibility and speed in the determination of protein aggregates, with limited manipulation and without the use of exogenous probes. A sample and/or reference of the sampling system 1 is heated and left to equilibrate followed by spectral acquisition at the desired temperature and the determination of protein, peptide and peptoid, stability, aggregation and viability can be performed. The method can also be applied to the study of lipids, membrane proteins, hydrophilic proteins, peptides and peptoids as a single component or in binary or ternary mixtures with other peptides, or lipid mixtures.

When studying two protein components in a mixture or complex, one of the components can be isotopically labeled to allow for the simultaneous detection of each component. FT-IR spectroscopy can be combined with the 2DCOS which allows for determination of the presence of aggregates and determination of the mechanism of aggregation. This information can then be used to alter the protein manufacturing process to generate a more viable protein for development. In addition, the thermal transition of the protein can also be determined and a 2DCOS plot generated to compare with the established viable protein, allowing for quality control, stability, and viability of the desired protein product.

According to some embodiments, the sampling system 1 is not limited to analyzing proteins, peptides or peptoids, but may be used to analyze any desired composition such as a liquid sample, lipid, or polymers during thermal or other perturbation. According to one aspect of the subject technology, the dual cell holder can be applied to the study of substances (organic or inorganic), materials or reagents, and liquids in general. According to some embodiments, the dual cell holder can be used in spectrophotometers where a shuttle or automated method of sampling is used. According to some embodiments, the use of the sampling system 1 is not limited to the infrared range, but can also be used in UV and visible range, as well as circular dichroism (CD), vibrational circular dichroism, and Raman spectroscopies, for example, for the analysis of desired materials and substances.

According to some embodiments, the sampling system 1 can be used to determine protein-protein interactions ("PPI's") or protein-macromolecules (protein-lipid interactions, protein DNA or protein-RNA interactions or protein drug interactions). Also, the sampling system 1 can be used for the analysis of organic solutions, polymers, gels, nanostructures or small liquid crystals, etc.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the subject technology have been described, these have been presented by way of example only, and are not intended to limit the scope of the subject technology. Indeed, the novel methods and systems described herein may be embodied in a variety of other forms without departing from the spirit thereof. The accompanying claims and their equivalents are intended to cover such forms or modifications as would fall within the scope and spirit of the subject technology.

What is claimed is:

1. A slide comprising:
    a substrate forming a plurality of wells that are recessed relative to a surface of the substrate, wherein each of the wells forms a sample region that is recessed by a sample depth from the surface and a trough region that is recessed by a trough depth from the surface, the trough depth being greater than the sample depth
    wherein the substrate is a salt.

2. The slide of claim 1, wherein the substrate transmits electromagnetic radiation.

3. The slide of claim 1, wherein a periphery of the slide forms a bilaterally asymmetric shape.

4. The slide of claim 1, wherein the trough region extends entirely about the sample region.

5. The slide of claim 1, wherein the sample region is concentrically within the trough region.

* * * * *